US010217204B2

United States Patent
Chen et al.

(10) Patent No.: US 10,217,204 B2
(45) Date of Patent: Feb. 26, 2019

(54) IMAGING SYSTEM AND METHOD OF EVALUATING AN IMAGE QUALITY FOR THE IMAGING SYSTEM

(71) Applicant: Nuctech Company Limited, Haidian District, Beijing (CN)

(72) Inventors: Zhiqiang Chen, Beijing (CN); Yuanjing Li, Beijing (CN); Li Zhang, Beijing (CN); Ziran Zhao, Beijing (CN); Yaohong Liu, Beijing (CN); Jianping Gu, Beijing (CN); Zhiming Wang, Beijing (CN)

(73) Assignee: Nuctech Company Limited, Haidian District, Beijing (CN)

( * ) Notice: Subject to any disclaimer, the term of this patent is extended or adjusted under 35 U.S.C. 154(b) by 59 days.

(21) Appl. No.: 15/409,738

(22) Filed: Jan. 19, 2017

(65) Prior Publication Data
US 2017/0213331 A1 Jul. 27, 2017

(30) Foreign Application Priority Data
Jan. 22, 2016 (CN) .......................... 2016 1 0044544

(51) Int. Cl.
*G06K 9/62* (2006.01)
*G06T 5/00* (2006.01)
(Continued)

(52) U.S. Cl.
CPC .......... *G06T 7/0002* (2013.01); *G06K 9/6245* (2013.01); *G06K 9/6298* (2013.01);
(Continued)

(58) Field of Classification Search
None
See application file for complete search history.

(56) References Cited

U.S. PATENT DOCUMENTS

| 2015/0379373 A1* | 12/2015 | Bhatia | G06K 9/036 |
| | | | 382/197 |
| 2016/0092751 A1* | 3/2016 | Zavesky | G06K 9/6202 |
| | | | 382/205 |
| 2017/0091964 A1* | 3/2017 | Luo | G06T 11/006 |

FOREIGN PATENT DOCUMENTS

| CN | 104091343 A | * | 10/2014 |
| CN | 104376565 A | * | 2/2015 |
| CN | 105005990 A | * | 10/2015 |

OTHER PUBLICATIONS

Priya et al., "A novel sparsity-inspired blind image quality assessment algorithm," 2014 IEEE Global Conference on Signal and Information Processing (GlobalSIP), Atlanta, GA, 2014, pp. 984-988 (Year: 2014).*

(Continued)

*Primary Examiner* — Justin P. Misleh
(74) *Attorney, Agent, or Firm* — Merchant & Gould P.C.

(57) ABSTRACT

A method of evaluating an image quality for an imaging system and the imaging system are provided. The method in some examples includes: acquiring an image to be evaluated which is generated by the imaging system; extracting a number of sub-images from the image; obtaining a coefficient vector indicating a degree of sparsity by applying a sparse decomposition on the sub-images based on a pre-set redundant sparse representation dictionary; and performing a linear transformation on the coefficient vector so as to obtain an evaluation value for the image quality. The sparse dictionary is learned by only using a few high quality perspective images, and then the image quality is evaluated based on the sparse degree of the image obtained by using the sparse dictionary. A convenient and rapid no-reference image quality evaluation is achieved.

8 Claims, 4 Drawing Sheets

(51) Int. Cl.
*G06T 7/00* (2017.01)
*G06T 3/00* (2006.01)
*G06K 9/46* (2006.01)

(52) U.S. Cl.
CPC ...... *G06T 5/002* (2013.01); *G06K 2009/4695* (2013.01); *G06T 3/0056* (2013.01); *G06T 2207/10116* (2013.01); *G06T 2207/20021* (2013.01)

(56) References Cited

OTHER PUBLICATIONS

Guha et al., "Learning sparse models for image quality assessment," 2014 IEEE International Conference on Acoustics, Speech and Signal Processing (ICASSP), Florence, 2014, pp. 151-155 (Year: 2014).*

Guha et al., Sparse representation-based image quality assessment, Image Communication, v. 29 n. 10, 2014, pp. 1138-1148 (Year: 2014).*

\* cited by examiner

IMAGING SYSTEM AND METHOD OF EVALUATING AN IMAGE QUALITY FOR THE IMAGING SYSTEM

This application claims benefit of Serial No. 201610044544.7, filed 22 Jan. 2016 in China and which application is incorporation herein by reference. A claim of priority is made to the above disclosed application.

TECHNICAL FIELD

Embodiments of the present application relate to evaluating an image quality for radiation images, and in particular, relate to a method of evaluating an image quality of perspective images and its corresponding imaging system.

BACKGROUND

In a perspective imaging system, a degradation of an image quality usually occurs. For example, an instability of a X-ray source or a detector will introduce a noise, which will affect a visual effects for an image, an observation of inspectors to an image content, and a discovery of the suspected area in the image. A degree for the noise in the imaging system can be estimated by using a certain evaluation algorithm, so as to monitor the stability of the imaging system in time.

In consideration of the fact that a non-degraded reference image can not be obtained in practical application, a method of evaluating the image quality without the reference image is more practical. The method of evaluating the image quality without the reference image may include a rule-based method, a machine learning based method, a probabilistic model based method, and the like. The essence of each method is to attempt to find a difference between high-quality images and degraded images statistically. For the rule-based method, it is difficult to devise a certain rule to distinguish different image qualities based on different features, due to the complexity of degeneration factors. For the machine learning based method, it is necessary to learn the images with different image qualities pre-marked by human observers. Thus, there is a heavy workload, and there may be differences between different marking people. For the probabilistic model based method, the statistical probability model of the image feature is established by only using some high-quality images. During the evaluation, the image quality can be obtained by calculating a probability of current image in the probability model. However, the probabilistic model based method needs to choose a certain probability mathematical model. When the model is too complex, it is difficult to perform parameter estimation, while it can not describe changes of image content effectively when the model is too simple. In addition, the learning of model parameters requires a large amount of data, and the iterations in the learning process also make the speed slower.

SUMMARY

In view of one or more problems in the prior art, an imaging system and an image quality evaluation method are proposed.

In one aspect of the present invention, a method of evaluating an image quality for an imaging system is provided, which may comprise: acquiring an image to be evaluated which is generated by the imaging system; extracting a plurality of sub-images from the image; obtaining a coefficient vector indicating a degree of sparsity by applying a sparse decomposition on the plurality of sub-images based on a pre-set redundant sparse representation dictionary; and performing a linear transformation on the coefficient vector so as to obtain an evaluation value for the image quality.

According to some embodiments, the redundant sparse representation dictionary may be set by: establishing an image data set according to images generated by the imaging system; extracting sub-images from perspective images in the image data set; and setting the redundant sparse representation dictionary by learning the extracted sub-images with a dictionary learning algorithm.

According to some embodiments, the learning the extracted sub-images with the dictionary learning algorithm may comprise: generating an initial dictionary by performing a cosine transformation on the extracted sub-images, and optimizing the initial dictionary using the dictionary learning algorithm, so as to set the redundant sparse representation dictionary.

According to some embodiments, the performing a cosine transformation on the extracted sub-images may further comprise: obtaining the coefficient vector by projecting each of the plurality of sub-images of the image to be evaluated onto the redundant sparse representation dictionary; calculating an L1 norm for each coefficient in the coefficient vector; averaging the L1 norms for respective sub-images to obtain an average degree of sparsity; and determining the evaluation value based on the average degree of sparsity.

According to some embodiments, the method may further comprise: performing a partial mean subtracted contrast normalised (MSCN) process on perspective images to be evaluated.

According to some embodiments, the method may further comprise: prompting a user if the evaluation value does not satisfy a predetermined condition.

In another aspect of the present disclosure, an imaging system is proposed, which may comprise: a scanning device, configured to scan an inspection object so as to obtain scanning data; a data processing device, configured to reconstruct an image for the inspection object based on the scanning data, to extract a plurality of sub-images from the image, to obtain a coefficient vector indicating a degree of sparsity by applying a sparse decomposition on the plurality of sub-images based on a preset redundant sparse representation dictionary, and to perform a linear transformation on the coefficient vector, so as to obtain an evaluation value for an image quality.

According to some embodiments, the data processing device may be further configured to obtain the coefficient vector by projecting each of the plurality of sub-images of the image to be evaluated onto the redundant sparse representation dictionary; to calculate an L1 norm for each coefficient in the coefficient vector; to average the L1 norms for respective sub-images to obtain an average degree of sparsity; and to determine the evaluation value based on the average degree of sparsity.

According to some embodiments, the data processing device may be further configured to perform a partial mean subtracted contrast normalised (MSCN) process on perspective images to be evaluated.

According to some embodiments, the data processing device may be further configured to prompt a user if the evaluation value does not satisfy a predetermined condition.

With the schemes discussed above, it is possible to evaluate the images generated during a inspection process automatically and rapidly, thus ensuring a stable operation of the imaging system.

BRIEF DESCRIPTION OF THE DRAWINGS

For a better understanding of the present invention, embodiments of the present invention will be described in accordance with the following drawings.

The drawings do not show all circuits or structures of the embodiment. Like reference numerals refer to like or similar parts or features throughout the drawings.

DETAILED DESCRIPTION

Figure 1A:
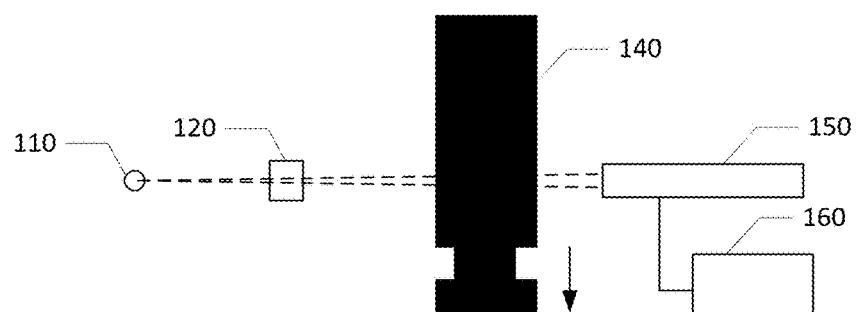
FIGS. 1A and 1B are structural diagrams of an imaging system according to an embodiment of the present invention.

Reference will now be made in detail to the specific embodiments of the present invention. It should be noted that the embodiments described herein are for illustrative purposes only and are not intended to limit the present invention. In the following description, numerous specific details are set forth in order to provide a thorough understanding of the present invention. However, it will be apparent to those skilled in the art that it is unnecessary to practice the present invention with these specific details. In other instances, well-known circuits, materials or methods have not been specifically described in order to avoid obscuring the present invention.

Throughout the specification, reference to "one embodiment", "an embodiment", "one example" or "an example" means that a particular feature, structure or characteristic described in connection with the embodiment or example may be included in at least one embodiment of the present invention. Thus, the phrases "in one embodiment", "in an embodiment", "in one example" or "in an example" throughout the specification are not necessarily all referring to the same embodiment or example. In addition, specific features, structures or characteristics may be combined in one or more embodiments or examples in any suitable combination and/or sub-combination forms. In addition, it will be understood by those skilled in the art that the drawings provided herein are for the purpose of illustration, and the drawings are not necessarily to be scaled. The term "and/or" as used herein may include any and all combinations of one or more associated items as listed herein.

In view of the problems in the prior art, an embodiment of the present invention provides a method of evaluating an image quality of a reference-free and noise-contained image based on a sparse representation of the image, in which a sparse dictionary is learned by using a few high quality perspective images, and then the image quality is evaluated based on the sparse degree of the image which is obtained by using the sparse dictionary. For example, the learned sparse dictionary is used to apply a sparse decomposition on the image to be evaluated, and a quantitative evaluation for the image quality of the image is obtained according to an degree of sparsity. By using a result of such quantitative evaluation, the image quality of images newly generated by the imaging system can be evaluated, and the image quality of the imaging system can be dynamically monitored. Therefore, this can provide a technical support for a smooth operation of the whole X-ray inspection system.

In accordance with some embodiments of the present invention, with respect to a high quality X-ray image, an intrinsically key feature of such an image is extracted for a particular imaging system, and then an image block sparse representation model is established. Based on the degree of sparsity of the noise image in this model, the image quality of a real image with noise distortion can be evaluated quickly and accurately.

Figure 1B:
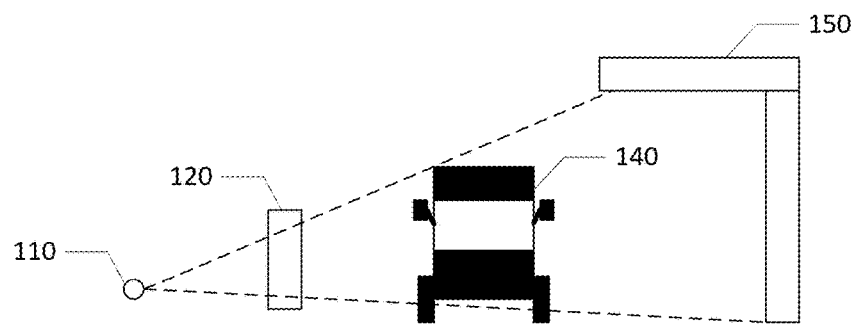

FIGS. 1A and 1B are schematic structural views of an imaging system according to an embodiment of the present invention. FIG. 1A shows a schematic top view of the imaging system, and FIG. 1B shows a front view of the imaging system. As shown in FIGS. 1A and 1B, the radiation source 110 may emit a X-ray and pass the X-ray through a collimator 120, so as to perform a security detection on a moving container truck 140. Then, a radiation penetrating the truck 140 may be received and converted into a digital signal by a detector 150. Finally, a perspective image can be obtained by a data processing device 160 such as a computer, according to the digital signal. According to an embodiment of the present invention, after obtaining the perspective image of the container truck 140 by scanning, the data processing device 160 may evaluate the image quality by using the redundant sparse representation dictionary that has been set in advance.

Figure 2:
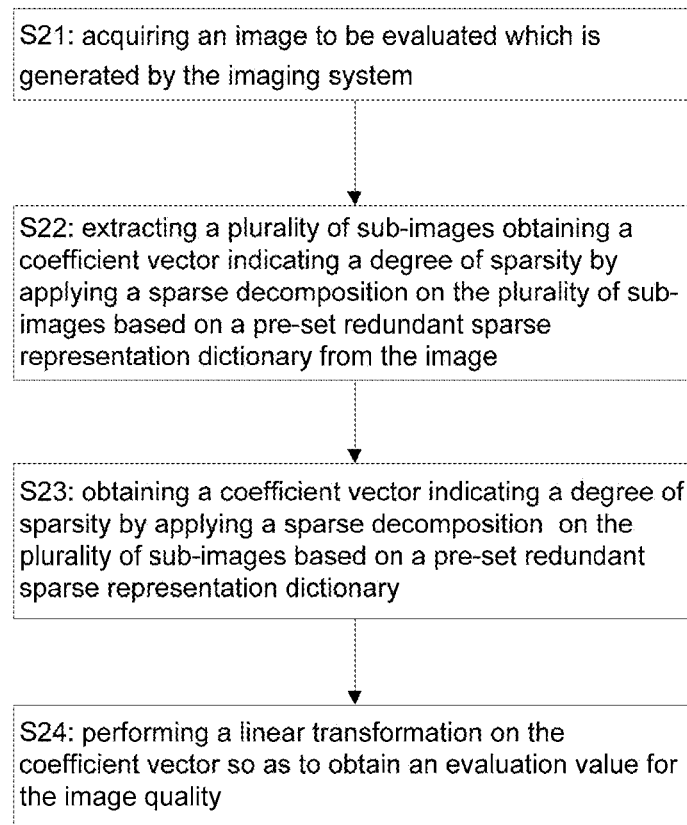
FIG. 2 is a schematic flow chart illustrating a method of evaluating the image quality according to an embodiment of the present invention.

FIG. 2 is a schematic flow chart illustrating a method of evaluating the image quality according to an embodiment of the present invention.

Figure 3:
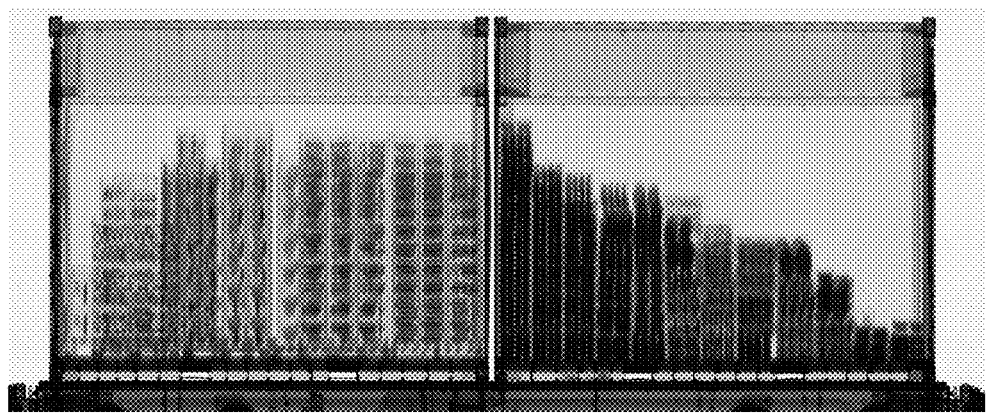
FIG. 3 illustrates an example illustrating a scanning perspective image for a container according to an embodiment of the present invention.

As shown in FIG. 2, in step S21, the data processing device 160 acquires an image to be evaluated which is generated by the imaging system. For example, for a selected application, some high-quality image data is collected to form a data set. For example, FIG. 3 is a perspective image of a two-container inspection system, wherein the image size ranges from 800*2000 to 2000*8000, and the total image data set contains 30 images, cumulative pixels.

Figure 4:
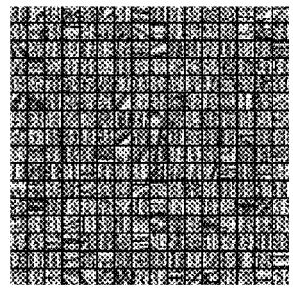
FIG. 4 is an example illustrating normalized sub-images according to an embodiment of the present invention.

In step S22, the data processing device 160 extracts a plurality of sub-images from the image. For example, a partial mean subtracted contrast normalised (MSCN) process is performed for each image, from which 2000 of 8*8 sub-images are randomly extracted. FIG. 4 shows partially normalized sub-image data.

In step S23, the data processing device 160 may obtain a coefficient vector indicating a degree of sparsity by applying a sparse decomposition on the plurality of sub-images based on a pre-set redundant sparse representation dictionary. The coefficient vector is projected to the preset redundant sparse representation dictionary by using the OMP (Orthogonal Matching Pursuit) algorithm or other similar algorithms, so as to obtain a 256-dimensional coefficient vector. For example, the number of dictionary entries is set to be 256. Then, an initial dictionary is generated by using the redundant cosine transform. Next, the initial dictionary is optimized by using the K-SVD algorithm. The sparse dictionary as shown in FIG. 4 is finally obtained.

In step S24, the data processing device 160 may perform a linear transformation on the coefficient vector so as to obtain an evaluation value for the image quality. For example, an L1 norm for the coefficient vector (the absolute sum of all coefficients) x is calculated, and the L1 norms for all sub-images are averaged to obtain the average degree of sparsity m. The score of image quality y is calculated as follows:

$$y = k(m-1) + b \tag{1}$$

where k and b are both constants, which only affect the ranges of the image quality evaluation results, and do not affect the trend of the results. Thus, k and b can be set according to the desired range of the image quality evaluation results. The larger the value, the worse the image quality. For example, when the sub image has a size of 8*8, and the number of dictionary entries is 256, the typical value is: k=3, b=−50. It will be appreciated by those skilled in the art that in other embodiments, the constants k and b may be taken as other values.

Figure 5:
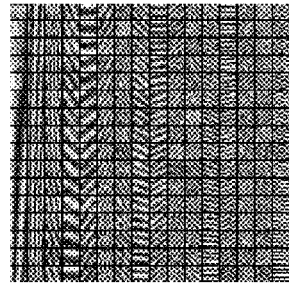
FIG. 5 is an example of an sparse dictionary according to an embodiment of the present invention.

FIG. 5 shows an example of a sparse dictionary according to an embodiment of the present invention.

Figure 6:
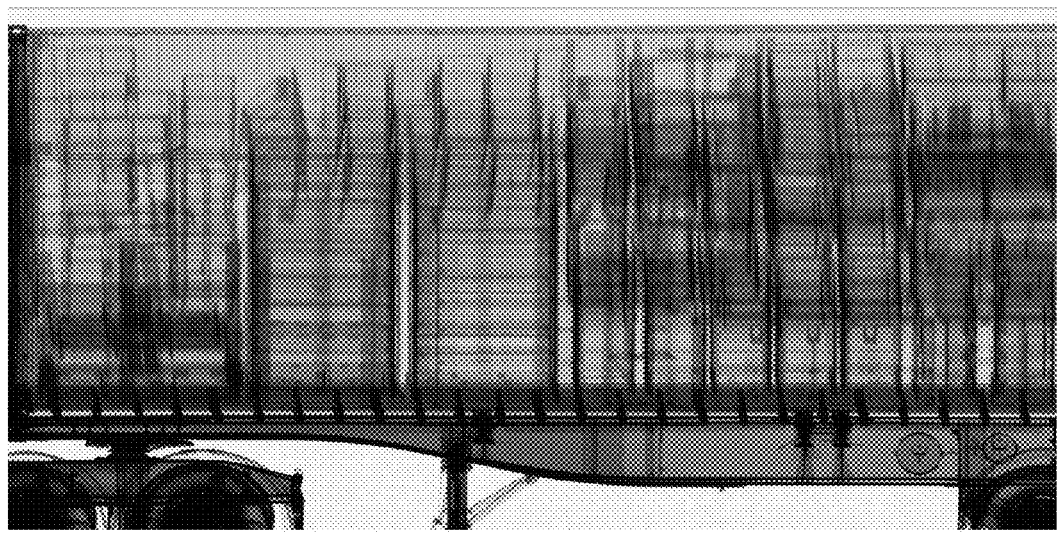
FIG. 6 is an example of a noise-free image (score 8.78) according to an embodiment of the present invention.
Figure 7:
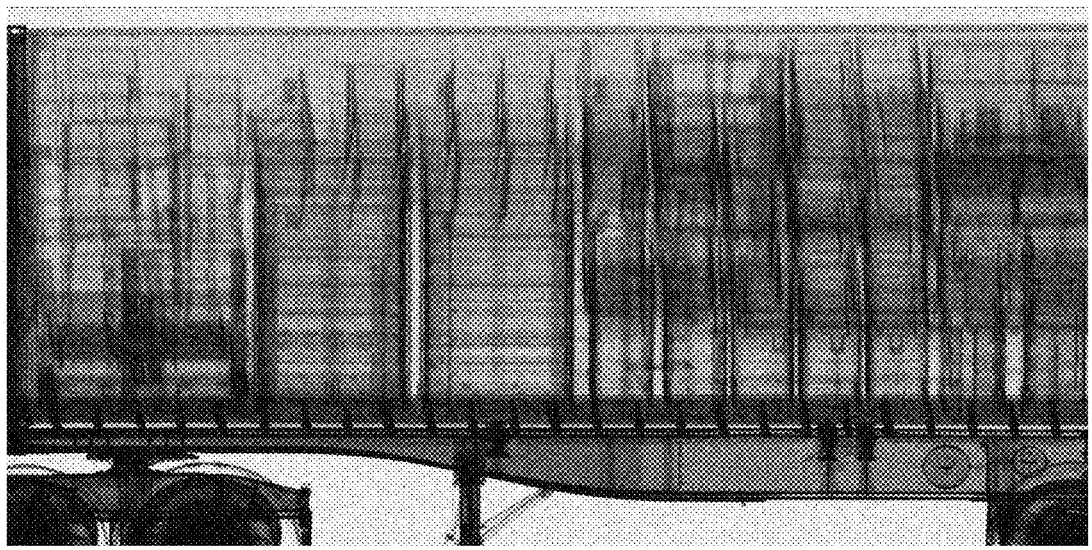
FIG. 7 is an example of a noise-contained image (score 71.35) according to an embodiment of the present invention.

FIG. 6 is an example of a noise-free image (score 8.78) according to an embodiment of the present invention. FIG. 7 is an example of a noise-contained image (score 71.35) according to an embodiment of the present invention. Although the present disclosure has been described with reference to the above-described embodiments which take specific image size, specific size for an sub-image and specific number of sub-images as examples, it will be appreciated by those skilled in the art that the image size, the size for the sub-image and the number of sub-images can be others in practical application.

In an embodiment of the present invention, a sparse representation model is established based on a plurality of high quality X-ray images, and the image quality of other noise images is estimated based on this model. The whole process is performed automatically and rapidly, without a naked eye to mark the image quality. Besides, the process does not need to set an evaluation rule of distinguishing the image quality according to the different image features. For example, with respect to a certain imaging system, a certain amount of high-quality noise-free image data is collected, and then a typical image data set is established. In general, more than 30 of image data with a resolution being not less than 500*1000 pixels should be collected. When the image resolution is relatively low, the deficiency can be compensated by adding image data. Next, a partial MSCN (Mean Subtracted Contrast Normalised) process is performed for the obtained images, from which a plurality of sub-images with a size of 8*8 are randomly extracted, and the total number of sub-images is not less than 100,000. A redundant sparse representation dictionary is obtained by using the K-SVD algorithm (or other similar algorithm) (i.e., the number of entries in the dictionary is larger than dimensionality of the dictionary). For a 8*8 sub-image, the typical size of the image dictionary is 256. The image quality can be evaluated in the subsequent inspection process by using the preset redundant sparse representation dictionary.

Compared with the conventional no-reference image quality evaluation methods, the image quality evaluation method of the above-described embodiments has the following advantages:

(1) High Degree of Automation and Easy to Use. For example, in the process of collecting the high quality X-ray image data with a naked eye, it is unnecessary to give a specific score for each image by the naked eye, and it is also unnecessary to collect distorted images with different degrees of noise, or to generate image data with different image quality by using a artificially adding method. In the process of learning the whole dictionary, in addition to setting a small number of parameters, the algorithm will automatically perform the initialization of the dictionary and the optimization process. In the evaluation process, the algorithm automatically perform an optimal decomposition and calculate the degree of sparsity, and get the final quality evaluation;

(2) High Versatility Sparse dictionaries abstract characteristics of the basic structure of sub-images, rather than a particular or several specific types of noise. Noise caused by any factors will enable the sub-images to deviate from its instinct degree of sparsity, thereby degrading the degree of sparsity. Therefore, the proposed method is suitable for the quantitative evaluation of the influence of noise caused by different factors on the image quality.

(3) High Execution Speed. As the input used herein is normalized sub-images, the execution speed has been significantly improved without extracting features.

According to the embodiments of the present invention, a redundant sparse representation dictionary is obtained for a specific imaging system, and then the image quality of large amount of images can be evaluated during the operation. In the evaluation, the calculation amount is small, which can enable a convenient and rapid no-reference image quality evaluation. For example, when an image having a quality that does not conform to a prescribed value (e.g., a predetermined threshold value) is found, the user is prompted to reduce the misdetection rate.

Detailed description of the invention has been described by using a schematic diagram, a flowchart, and/or an example. In a case that such schematics, flowcharts, and/or examples include one or more functions and/or operations, those skilled in the art will appreciate that each function and/or operation in such a schematic, flow diagram or example can be realized by any combination of various structures, hardware, software, firmware, or substantially any of them independently and/or collectively. In one embodiment, several parts of the subject matter described in the embodiments of the present invention may be implemented by application specific integrated circuits (ASICs), field programmable gate arrays (FPGAs), digital signal processors (DSPs), or other integrated formats. However, those skilled in the art will recognize that some aspects of the embodiments disclosed herein may be implemented equivalently in an integrated circuit as a whole or a part of it, implemented as one or more computer programs running on one or more computers (e.g., implemented as one or more programs running on one or more computer systems), implemented as one or more programs running on one or more processors (e.g., implemented as one or more programs running on one or more microprocessors), implemented as firmware, or substantially implemented in any combination of the above-described manners, and those skilled in the art will incorporate capabilities for designing such circuit and/or writing such software and/or firmware code in accordance with the present disclosure. In addition, those skilled in the art will recognize that the mechanisms of the subject matter described herein can be distributed as various forms of program product, and regardless of the particular type of signal bearing medium that is actually used to perform the distribution, exemplary embodiments are applicable. Examples of signal bearing media may include, but are not limited to, recordable type media such as floppy disks, hard disk drives, compact disks (CDs), digital versatile disks (DVDs), digital tapes, computer memories, and the like; and transmission type media such as digital and/or analog communication media (e.g., fiber optic cables, waveguides, wired communication links, wireless communication links, etc.).

While the present invention has been described with reference to several exemplary embodiments, it is to be understood that the terminology used herein is illustrative and exemplary, but not limiting. As the present invention can be embodied in many forms without departing from the spirit or substance of the invention, it is to be understood that the above-described embodiments are not limited to any of the foregoing details, but are to be construed broadly within the spirit and scope of the appended claims. All changes and modifications that fall within the spirit and scope of the claims or the equivalents thereof are therefore intended to be embraced by the appended claims.

We claim:

1. A method of evaluating an image quality for an imaging system, comprising:
   scanning an inspection object so as to obtain scanning data;
   reconstructing an image for the inspection object based on the scanning data;
   extracting a plurality of sub-images from the image;
   obtaining a coefficient vector for each sub-image of the plurality of sub-images, the coefficient vectors indicating a degree of sparsity and obtained by applying a sparse decomposition on the plurality of sub-images based on a preset redundant sparse representation dictionary and by projecting each of the plurality of sub-images onto the redundant sparse representation dictionary; and
   performing a linear transformation on the coefficient vectors to obtain an evaluation value for the image quality, wherein the performing comprises:
      calculating an L1 norm for each coefficient component in each of the coefficient vectors;
      averaging the L1 norms to obtain an average degree of sparsity; and
      determining the evaluation value based on the average degree of sparsity.

2. The method of claim 1, wherein the redundant sparse representation dictionary is set by:
   establishing an image data set according to images generated by the imaging system;
   extracting sub-images from perspective images in the image data set; and
   setting the redundant sparse representation dictionary by learning the extracted sub-images with a dictionary learning algorithm.

3. The method of claim 2, wherein the learning the extracted sub-images with the dictionary learning algorithm comprises:
   generating an initial dictionary by performing a cosine transformation on the extracted sub-images, and optimizing the initial dictionary using the dictionary learning algorithm, so as to set the redundant sparse representation dictionary.

4. The method of claim 1, wherein the extracting comprises performing a partial mean subtracted contrast normalised (MSCN) process on the image.

5. The method of claim 1, further comprising:
   prompting a user if the evaluation value does not satisfy a predetermined condition.

6. An imaging system, comprising:
   a scanning device, comprising a detector and configured to scan an inspection object so as to obtain scanning data;
   a data processing device configured to reconstruct an image for the inspection object based on the scanning data to extract a plurality of sub-images from the image, to obtain a coefficient vector for each sub-image of the plurality of sub-images, the coefficient vectors indicating a degree of sparsity and obtained by applying a sparse decomposition on the plurality of sub-images based on a preset redundant sparse representation dictionary and by projecting each of the plurality of sub-images onto the redundant sparse representation dictionary, the data processing device further configured to perform a linear transformation on the coefficient vectors to obtain an evaluation value for image quality, wherein the linear transformation comprises: calculating an L1 norm for each coefficient component in each of the coefficient vectors, averaging the L1 norms to obtain an average degree of sparsity, and determining the evaluation value based on the average degree of sparsity.

7. The imaging system of claim 6, wherein the data processing device is further configured to perform a partial mean subtracted contrast normalised (MSCN) process on the image.

8. The imaging system of claim 6, wherein the data processing device is further configured to prompt a user if the evaluation value does not satisfy a predetermined condition.

* * * * *